July 9, 1940.  B. H. ANIBAL  2,207,367
SPRING SUSPENSION
Filed Jan. 5, 1938   2 Sheets-Sheet 1

Inventor
Benjamin H. Anibal
By
Blackmore, Spencer & Flint
Attorneys

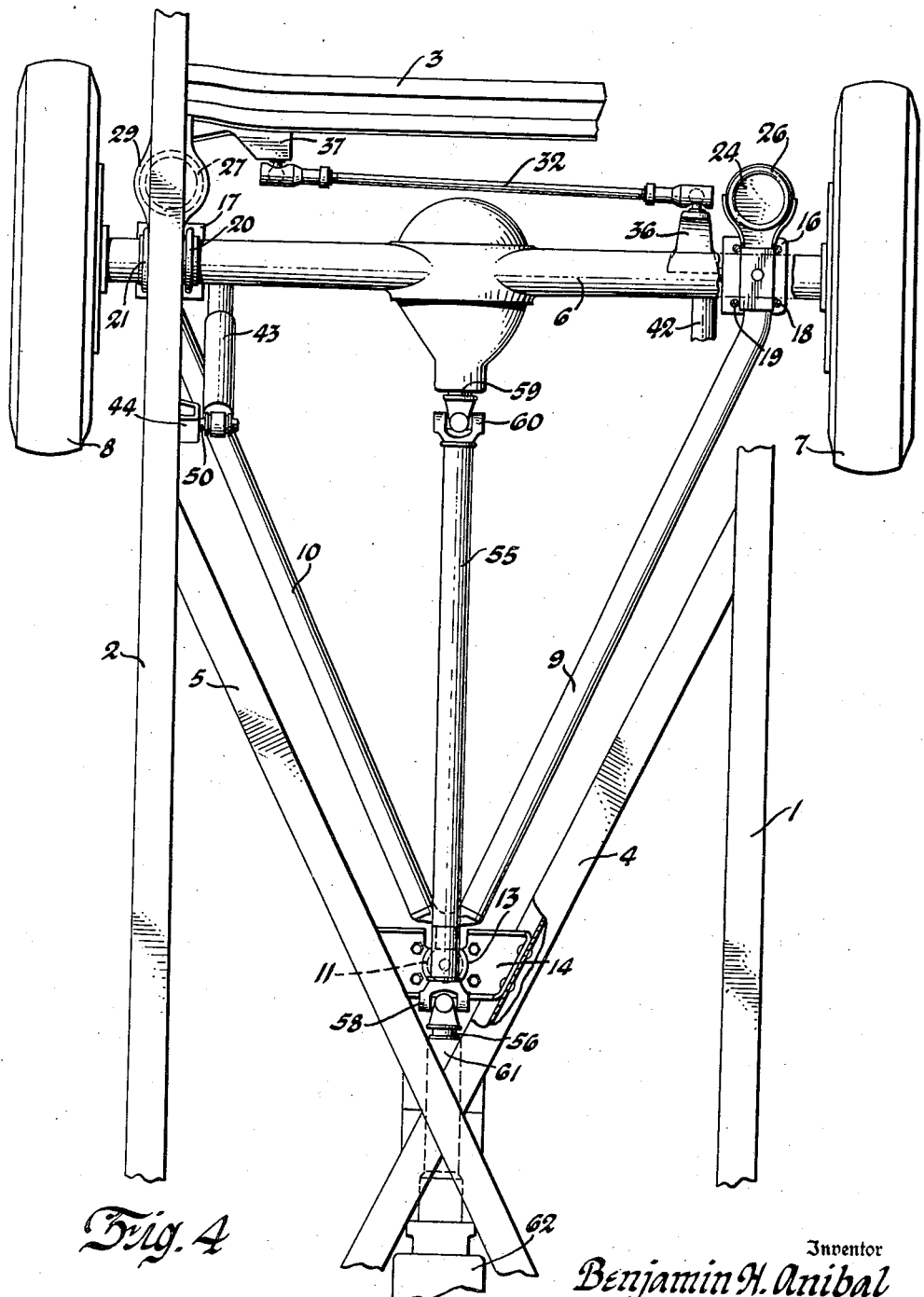

Patented July 9, 1940

2,207,367

UNITED STATES PATENT OFFICE 2,207,367

SPRING SUSPENSION

Benjamin H. Anibal, Pontiac, Mich., assignor to General Motors Corporation, Detroit, Mich., a corporation of Delaware Application January 5, 1938, Serial No. 183,440

2 Claims. (Cl. 267—20)

This invention relates to a means of suspending a vehicle frame on a road wheel axle.

It relates, particularly to a suspension means for a conventional axle carrying road wheels on opposite sides of the vehicle, in which the resilient means is relieved of all functions other than the springing of the vehicle, and specifically to a coil spring suspension system.

The object of the invention is an axle of which the movement in a vertical plane longitudinally of the vehicle is controlled by radius arms pivotally connected to the vehicle frame and extending on the opposite side of the axle from their pivot axis to provide seatings for spring means having the single function of resiliently resisting upward movement of the axle relatively to the frame.

The above and other objects of the invention will be apparent as the description proceeds.

The drawings show the application of the invention to a rear driving axle of a vehicle in which the driving thrust of the road wheels and the driving torque reaction as well as the braking torque reaction is taken through the radius arms.

In the drawings

Fig. 4 is a plan view of the rear end of the motor vehicle chassis to which the invention has been applied.

Figure 1:
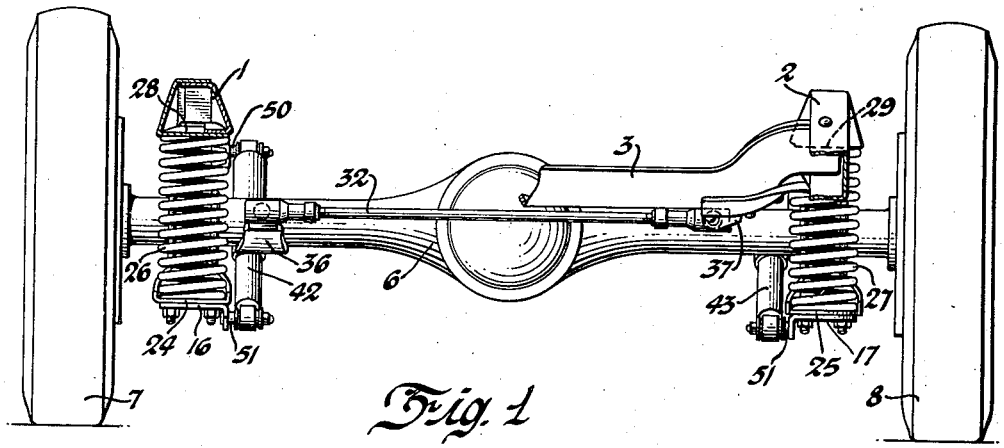
Fig. 1 is a rear view of a rear axle with suspension means according to the invention.

The vehicle frame has longitudinal side members 1 and 2, a transverse member 3, and X members 4 and 5.

The rear axle housing 6 supports driven rear wheels 7 and 8, and its movement longitudinally of the vehicle is controlled by the arms 9 and 10 of a V-shaped radius member having a ball 11 at its apex, which is mounted in a rubber socket 12 in a housing 13 forming a strut 14 between the X members 4 and 5.

The spaced apart ends of the arms 9 and 10 are rigidly connected to the underside of the axle housing 6 between seatings such as 15 and sole plates 16 and 17 at points towards the opposite ends of the axle housing by means of U-shaped clips 18, 19 and 20, 21.

According to the invention the arms 9 and 10 are extended rearwardly of the axle to provide seatings 24 and 25 for the lower ends of substantially vertically disposed coil springs 26 and 27 respectively. The upper ends of the coil springs are provided with seatings 28 and 29 on the longitudinal frame members 1 and 2.

Movement of the rear axle housing 6 transversely of the vehicle is controlled by a radius rod 32 which has one end ball jointed to a bracket 36 on the axle housing 6, towards the left hand side of the vehicle, and its other end ball jointed to a bracket 37 on the transverse member 3 of the frame.

Figure 2:
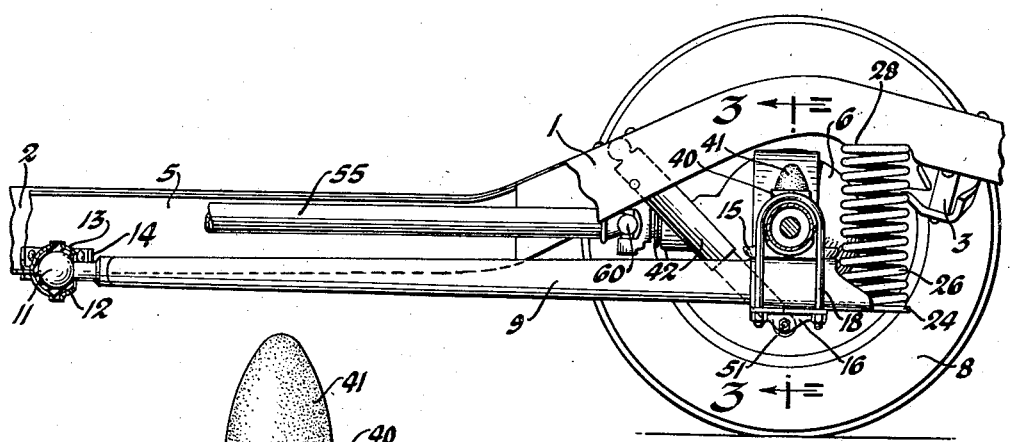
Fig. 2 is a side view.
Figure 3:
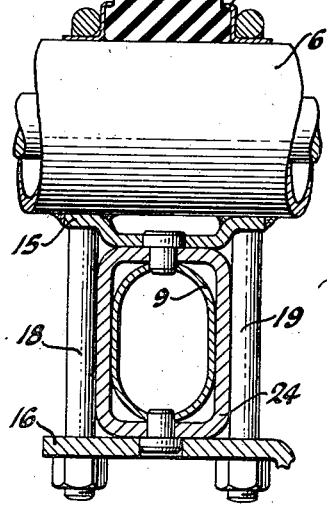
Fig. 3 is an enlarged section on line 3—3 of Fig. 2.

On the upper side of the axle housing 6, and embraced by the clips 18, 19 and 20, 21 are brackets such as 40 for rubber bumpers such as 41 as shown in Figs. 2 and 3. The rubber bumpers 41 coact with the longitudinal side members 1 and 2 of the frame, resiliently to resist and cushion extreme upward deflections of the axle housing 6 relatively to the vehicle frame.

A pair of direct acting hydraulic shock absorbers 42 and 43 of well-known type, are operative between the axle housing 6 and the vehicle frame. The shock absorber 43 has one end pivotally connected to a bracket 44 on the frame member 2 and its other end is pivotally connected to the sole plate 17. The shock absorber 42 is similarly connected between the frame member 1 and the sole plate 16. The pivotal connections for the shock absorbers provide for a degree of universal movement as well as pivotal movement and preferably include pivot pins 50 and 51 riveted respectively to the brackets such as 44 on the frame members 1 and 3 and to the sole plates 16 and 17. The pivot pins 50 and 51 are substantially horizontal and parallel to each other transversely of the vehicle in the normal position of the parts and are provided with resilient rubber bushings of well-known form. It will be appreciated that the resilient rubber bushings permit the requisite small degree of universal movement as well as pivotal movement of the shock absorbers, in order that they may be self-accommodating to the prescribed movements of the axle, about pivot axes in different non-parallel planes. They also provide a certain amount of insulation against the transmission of noise.

As arranged, the direct acting shock absorbers 42 and 43 function also, to some extent, as telescopic guides, tending to restrict the axle to simple movement in an arc of a circle about a normally horizontal transverse axis through the center of the ball 11 of the V-shaped member.

The drive to the axle housing 6 is through a short propeller shaft 55 which is connected to an extension 56 of the transmission driven shaft through a universal joint 58 and to the rear axle drive shaft 59 through a universal joint 60. The extension 56 is supported in a tubular extension 61 of the transmission housing 62 and is connected with the transmission driven shaft through a sliding coupling (not shown) which permits the shortening and lengthening of the distance from the rear axle drive shaft to the transmission to conform with the prescribed movements of the axle housing 6.

It will be seen that the driving thrust of the road wheels 7 and 8 is transmitted to the vehicle frame through the arms 9 and 10 of the V-shaped radius member, and that the driving and brake torque reaction is also taken through the arms 9 and 10, thus relieving the springs 26 and 27 of all functions other than the springing of the vehicle.

I claim:

1. In a motor vehicle, in combination, a frame, a driving axle carrying road wheels on opposite sides of the vehicle, a pair of tubular radius arms to take the driving thrust and torque, said radius arms having one end pivotally connected to the vehicle frame, tubular extensions sleeved over the opposite ends of the radius arms and rigidly secured thereto, said extensions extending below and beyond the axle and being rigidly clamped to the underside of opposite ends of the axle, and spring means having the single function of resiliently resisting upward movement of the axle relatively to the frame, said spring means being operative between seatings on the vehicle frame and on the extensions upon the axle.

2. The combination according to claim 1 in which the radius arms are united at their point of pivotal connection to the vehicle frame and terminate in a ball which is mounted in a rubber socket on the vehicle frame, movement of the axle transversely of the vehicle being controlled by a transverse radius rod having one end pivotally connected to the vehicle frame towards one side of the vehicle and its other end pivotally connected to the axle towards the other side of the vehicle.

BENJAMIN H. ANIBAL.